United States Patent [19]

Chang et al.

[11] Patent Number: 4,784,749

[45] Date of Patent: Nov. 15, 1988

[54] CRACKING/DEWAXING

[75] Inventors: Clarence D. Chang, Princeton; David S. Shihabi, Pennington, both of N.J.; Paul B. Weisz, Yardley, Pa.

[73] Assignee: Mobil Oil Corporation, New York, N.Y.

[21] Appl. No.: 82,398

[22] Filed: Aug. 6, 1987

Related U.S. Application Data

[63] Continuation-in-part of Ser. No. 864,746, May 13, 1986, Pat. No. 4,701,313, which is a continuation of Ser. No. 683,768, Dec. 19, 1984, abandoned.

[51] Int. Cl.$^4$ .............................................. C10G 11/04
[52] U.S. Cl. .................................. 208/120; 208/116; 208/118; 208/117; 208/27; 525/739; 525/740; 525/742; 525/747; 423/277; 423/326; 423/328; 502/77; 502/85; 502/202
[58] Field of Search .............. 208/111, 114, 115, 116, 208/120; 423/277, 326, 328, 329; 502/77, 85, 202; 585/739, 740, 742, 747

[56] References Cited

U.S. PATENT DOCUMENTS

| | | | |
|---|---|---|---|
| Re. 28,341 | 2/1975 | Wadlinger et al. | 208/120 |
| Re. 29,948 | 3/1979 | Dwyer et al. | 502/62 |
| 3,308,069 | 3/1957 | Wadlinger et al. | 502/62 |
| 3,923,641 | 12/1975 | Morrison | 208/111 |
| 4,268,420 | 5/1981 | Klotz | 208/111 |
| 4,327,236 | 4/1982 | Klotz | 208/111 |
| 4,419,220 | 12/1983 | LaPierre et al. | 208/111 |
| 4,435,275 | 3/1984 | Derr et al. | 208/89 |
| 4,481,104 | 11/1984 | Walsh | 208/120 |
| 4,486,296 | 12/1984 | Oleck et al. | 208/111 |
| 4,501,926 | 2/1985 | LaPierre et al. | 585/739 |
| 4,518,485 | 5/1985 | LaPierre et al. | 208/89 |
| 4,530,756 | 7/1985 | Chang et al. | 208/111 |
| 4,541,919 | 9/1985 | LaPierre et al. | 208/111 |
| 4,554,065 | 11/1985 | Albinson et al. | 208/59 |
| 4,568,655 | 2/1986 | Oleck et al. | 208/111 |
| 4,569,833 | 2/1986 | Cortsema et al. | 208/119 |
| 4,599,162 | 7/1986 | Yen | 208/120 |
| 4,612,108 | 9/1986 | Angevine et al. | 208/97 |
| 4,624,774 | 11/1986 | Chang et al. | 423/305 |
| 4,658,075 | 4/1987 | Dessau et al. | 423/328 |
| 4,701,313 | 10/1987 | Chang et al. | 585/481 |

*Primary Examiner*—H. M. S. Sneed
*Assistant Examiner*—Helane Myers
*Attorney, Agent, or Firm*—Alexander J. McKillop; Michael G. Gilman; Dennis P. Santini

[57] ABSTRACT

A process is provided for converting feedstock comprising hydrocarbon compounds to product comprising hydrocarbon compounds of lower molecular weight than feedstock hydrocarbon compounds over a catalyst comprising a siliceous zeolite prepared by the method comprising providing zeolite Beta containing boron and aluminum, treating the zeolite with silicon tetrachloride at a temperature and for a time sufficient to replace boron with silicon, and recovering the siliceous zeolite having reduced boron content but substantially preserved initial aluminum content. In particular embodiments, the conversion is selective cracking for waxes and the process is useful for reducing the pour point of fuel oils and lubricants.

16 Claims, No Drawings

CRACKING/DEWAXING

CROSS-REFERENCE TO RELATED APPLICATIONS

This application is a continuation-in-part of application Ser. No. 864,746, filed May 13, 1986, now U.S. Pat. No. 4,701,313, which was a continuation of application Ser. No. 683,768, filed Dec. 19, 1984, now abandoned.

BACKGROUND OF THE INVENTION

1. Field of the Invention

This invention relates to a process for conversion of feedstock comprising hydrocarbon compounds to conversion product comprising hydrocarbon compounds of lower molecular weight than feedstock hydrocarbon compounds, e.g. cracking and dewaxing. The process comprises contacting, under conversion conditions, said feedstock with a catalyst comprising a siliceous zeolite having been prepared by the method comprising providing a boron-containing zeolite Beta, treating the zeolite with silicon tetrachloride at a temperature and for a time sufficient to replace boron with silicon, and recovering the siliceous zeolite having reduced boron content but substantially preserved initial aluminum content.

2. Description of the Prior Art

Zeolitic materials, both natural and synthetic, have been demonstrated in the past to have catalytic properties for various types of hydrocarbon conversions. Certain zeolitic materials are ordered, porous crystalline silicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and $AlO_4$ in which the tetrahedra are cross-linked by the sharing of oxygen atoms whereby the ratio of the total non-silicon lattice element, e.g. aluminum, and silicon atoms to oxygen is 1:2. The electrovalence of the tetrahedra containing, for example, aluminum is balanced by the inclusion in the crystal of a cation, for example, an alkali metal or an alkaline earth metal cation. This can be expressed wherein the ratio of the non-silicon lattice element, e.g. aluminum, to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given crystalline silicate by suitable selection of the cation. The spaces between the tetrahedra are occupied by molecules of water prior to dehydration.

Prior art techniques have resulted in the formation of a great variety of synthetic crystalline silicates. These silicates have come to be designated by convenient symbols, as illustrated by zeolite ZSM-5 (U.S. Pat. No. 3,702,886).

The use of certain zeolites as catalyst components is taught in U.S. Pat. No. 4,305,808, for example.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an X-ray diffraction pattern characteristic of ZSM-5. U.S. Pat. Nos. 4,061,724; 4,073,865 and 4,104,294 describe microporous crystalline silicas or organo silicates wherein the aluminum content present is at impurity levels. Zeolite Beta is described in U.S. Pat. No. 3,308,069, the contents of which are entirely incorporated herein by reference.

The use of zeolite Beta catalyst for dewaxing hydrocarbon feedstocks such as distillate fuel oils by isomerization is taught in U.S. Pat. Nos. 4,419,220 and 4,501,926. U.S. Pat. 4,486,296 teaches hydrodewaxing and hydrocracking of hydrocarbon feedstock over a three-component catalyst including zeolite Beta. Dewaxing paraffin-containing hydrocarbon feedstock involving a hydrotreating step ahead of the dewaxing step over zeolite Beta catalyst is disclosed in U.S. Pat. No. 4,518,485. U.S. Pat. No. 4,481,104 teaches distillate selective hydrocracking using large pore, high silica, low acidity catalyst, e.g. zeolite Beta catalyst. Hydrocracking $C_5^+$ naphthas over catalyst comprising zeolite Beta is taught in U.S. Pat. No. 3,923,641. A dewaxing process using a noble metal/zeolite Beta catalyst followed by a base metal/zeolite Beta catalyst is taught in U.S. Pat. No. 4,554,065. U.S. Pat. No. 4,541,919 teaches a dewaxing process using large pore zeolite catalyst such as zeolite Beta which has been coke selectivated; and U.S. Pat. No. 4,435,275 teaches a moderate pressure hydrocracking process which may use catalyst comprising zeolite Beta for producing low pour point distillates.

SUMMARY OF THE INVENTION

The present invention is directed to a process for conversion of feedstock comprising hydrocarbon compounds to conversion product comprising hydrocarbon compounds of lower molecular weight than feedstock hydrocarbon compounds, e.g. cracking and dewaxing. The process comprises contacting, under conversion conditions, said feedstock with a catalyst comprising siliceous zeolite having been prepared by the method comprising providing zeolite Beta containing boron and aluminum, treating the zeolite with silicon tetrachloride at a temperature and for a time sufficient to replace boron with silicon, and recovering the siliceous zeolite having reduced boron content but substantially preserved initial aluminum content.

DESCRIPTION OF DRAWING

The FIGURE presents data of Example 1 showing that treatment of boron-containing zeolite Beta with silicon tetrachloride as required herein reduces boron sites while aluminum sites remain essentially unchanged, each measured by ion exchange capacity.

EMBODIMENTS

The entire contents of application Ser. No. 864,746, now U.S. Pat. No. 4,701,313, are incorporated herein by reference.

The present invention provides a process for converting a feedstock comprising hydrocarbon compounds to conversion product comprising hydrocarbon compounds of lower molecular weight than feedstock hydrocarbon compounds which comprises contacting said feedstock at conversion conditions sufficient to convert said feedstock to said product with a catalyst composition prepared by the method detailed herein.

In a specific embodiment, the present invention provides a process for catalytically dewaxing a heavy oil stock to provide a catalytically dewaxed oil with reduced wax content which comprises contacting said oil stock at catalytic dewaxing conditions in a reaction zone in the presence of hydrogen with a catalyst composition as herein defined.

In another specific embodiment, the present invention provides a process for catalytically hydrodewaxing a lubricating oil base stock to provide a catalytically hydrodewaxed lubricating oil base stock with reduced wax content which comprises contacting said stock at catalytic hydrodewaxing conditions in a reaction zone in the presence of hydrogen with a catalyst composition as herein defined.

In general, conversion conditions for the present process include a temperature of from about 100° C. to about 800° C., a pressure of from about 10 kPa to about 20,300 kPa, a liquid hourly space velocity of from about 0.5 hr$^{-1}$ to about 100 hr$^{-1}$, and a hydrogen/feedstock hydrocarbon compound mole ratio of from 0 (no added hydrogen) to about 100.

Such a conversion process includes, as a non-limiting example, cracking hydrocarbons to lower molecular weight hydrocarbons with reaction conditions preferably including a temperatue of from about 230° C. to about 800° C., a pressure of from about 10 kPa to about 3,550 kPa, a liquid hourly space velocity of from about 0.6 hr$^{-1}$ to about 10 hr$^{-1}$, and a hydrogen/feedstock hydrocarbon compound mole ratio of from 0 to about 100.

When the feedstock to the present process comprises a heavy oil stock to be dewaxed, preferred conversion temperature is from about 230° C. to about 500° C. When the feedstock comprises a lubricating oil base stock to be dewaxed, preferred conversion temperature is also from about 230° C. to about 500° C., with a hydrogen/feedstock lubricating oil base stock mole ratio of from 0 to about 100.

For the catalyst of this invention, zeolite crystallization is performed by the proper choice of aluminum and another species acceptable to the zeolite framework so that the product contains the desired ultimate amount of aluminum and excess of the other species to facilitate the desired synthesis. The concentration of the other species is conventional and determinable by those skilled in the art. Preferably, the other species will comprise boron. Of course, other such species, having characteristics substantially the same as or equivalent to boron, can be used. The product is subsequently exposed to a flowing gas stream containing silicon tetrachloride at a temperature and for a time of exposure selected to extract substantially all of the other species. However, temperature and time are selected to substantially avoid extraction of aluminum from the lattice of the zeolite, and may be within the ranges of from about room temperature to about 400° C., for a time of from about 0.5 hour to about 48 hours. Thus, selection of the final aluminum content is accomplished by controlling the aluminum/other species ratio during synthesis and choosing conditions for the silicon substitution which will selectively convert the other species.

The temperature at which the removal of the other species will occur within the above range is determinable by a person skilled in this art.

Concerning the other species, the species is to be selected according to the teachings of this invention so that it permits extraction of substantially all, if not all, under certain temperature and time conditions, while substantially avoiding extraction of aluminum from the lattice of the zeolite. Such other species are known to those skilled in the art or can be selected by those silled in the art without undue experimentation. As mentioned above, boron is the preferred other species.

The structure of the zeolite for use as catalyst in this invention is that of zeolite Beta.

According to another embodiment of the invention, it relates to a zeolite having an intrinsically high aluminum concentration as synthesized. The aluminosilicate zeolite is converted into a form comprising at least two cationic constituents in selected ratio. The resulting zeolite is such that one of the cationic constituents, which is relatively easily converted by subsequent silicon treatment, exists in the concentration corresponding to the ultimately desired aluminum concentration to be attained on the zeolite. For example, the aluminosilicate synthesized is subjected to a base exchange solution containing sodium and ammonium ion so that subsequent drying and calcining will produce a mixture of the protonic and the sodium forms. The silicon halide treatment is then chosen under conditions of severity, such that the protonated aluminum will readily react, that is, the following reaction:

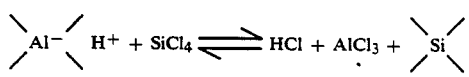

will take place, subsituting a silicon atom at the site. The acid and aluminum chloride are volatilized. Again, silicon tetrachloride is the preferred silicon substitution agent. The preceding illustration is merely illustrative and not limiting.

This procedure may be used based on the pair of cations being ammonium and alkali metal ion, an other pairs that may prove to be sufficiently different in reactivity with the silicon substitution agent. In all cases, the silicon substitution treatment is chosen in conditions of temperature and time to provide adequate protection of the aluminum framework species that is not to be extracted. The conditions mentioned in the preceding treatment occurring during crystallization can be utilized here. The selection of the source of the sodium and ammonium ion is readily mde by those skilld in th art. The drying and calcining procedures are conventional and knownt ot hose skilled in the art.

Thus, the catalyst treatment is characterized by a step of selecting an amount of aluminum to be retained in a product by use of a silicon substitution treatment which will substantially preserve the selected amount of aluminum framework species.

Without wishing to be bound by any particular theory of operability, it is believed that the silicon component of the silicon halide is deposited at the site previously occupied by the more reactive component to the silicon halide. Thus, it is considered that this method leads to even greater stabilization, because th vacancy left by this component is "filled" with another atom or molecule. However, the healing mechanism is not readlly known. Furthermore, this method can be used to introduce different atoms into the aluminosilicate structure, thus modifying catalytic function.

The improved characteristics of zeolite Beta treated in this fashion render it particulArly attractive for application in the present process.

The zeolite Beta treated as above can be in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In practicing the desired chemical conversion process, it may be useful to composite the treated zeolite Beta with matrix-comprising material resistant to the temperature and other conditions employed in the process. Such matrix material is useful as a binder and imparts additional resistance to the catalyst for the temperature, pressure and reactant feed stream velocity conditions allowed in the present process. The composite may be in the form of an extrudate.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or other in which the main mineral constituent is shalloysite, kaolinite, dickite, nacrite or anauxite. Such clays can be used in the raw state as originally mined or initially subjected to calcination, acid treatment or chemical modification.

In addition to the foregoing matrix materials, the catalyst employed herein may be composited with a porous matrix material such as alumina, silica, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. the matrix may be in the form of a cogel. The relative proportions of activity enhanced zeolite component and matrix, on an anhydrous basis, may vary widely with the zeolite content of the dry composite ranging from about 1 to about 99 percent by weight and more usually in the range of about 5 to about 80 percent by weight.

In order to more fully illustrate the nature of the invention and the manner of practicing same, the following examples are presented.

EXAMPLE 1

Zeolite Beta was obtained containing boron and aluminum as shown in the Figure. The boron and aluminum contents are depited in the Figure by ion exchange capacity in meq/g. The zeolite exhibited over 0.9 meq/g ion exchange capacity attributable to boron sits, and 0.08 meq/g ion exchange capacity attributable to aluminum sites. The zeolite Beta was contacted with silicon tetrachloride vapor at mild conditions, including atmospheric pressure and 315° C. for a total of about 20 hours. Periodically during the contacting period, the zeolite Beta was analyzed for remaining boron and aluminum sites by measuring its ion exchange capacity. The data generated is presented in the Figure, showing that the ion exchange capacity for the aluminum sites remained essentially constant, indicating no removal of aluminum sites from the zeolite Beta framework. The data also showed that the ion exchange capacity for the boron sites decreased steadily and significantly while the aluminum sites remained constant. After about 20 hours reaction time, the zeolite still exchibited about 0.08 meq/g ion exchange capacity attributable to the aluminum sites. This corresponds to a silica/alumina mole ratio of about 280.

EXAMPLE 2

To demonstrate utility of the present invention, the catalytic cracking activity of the hydrogen-form of the product zeolite of Example 1 is determined and compared to that of standard silica-alumina cracking catalyst by way of the Alpha Test. The alpha Value is an approximate indication of the catalytic cracking activity of the catalyst compred to the standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec $^{-1}$). The Alpha Test is described in U.S. Pat. No. 3,354,078 and in *The Journal of Catalysis*, Vol. IV, pp 522–529 (August 1965), each incorporated herein as to that description.

The product zeolite of Example 1 is exchanged with 1N NH$_4$NO$_3$, dried and air calcined at 500° C. to provide the zeolite for testing. It proves to have an alpha value of 20.

Although the invention has been described in conjunction with specific embodiments, it is evident that alternatives and variations will be apparent to those skilled in the art in light of the foregoing description. Accordingly, the invention is intended to embrace all of the alternatives and variations that fall within the spirit and scope of the appended claims.

What is claimed is:

1. A process for cracking a feedstock comprising hydrocarbon compounds to lower molecular weight hydrocarbon compounds, which process comprises contacting said feedstock at conversion conditions with a catalyst composition comprising a siliceous zeolite prepared by the method comprising providing a boron-containing zeolie Beta with initial boron and aluminum contents each greater than the numeral 0, treating the zeolite with silicon tetrachloride at a temperature for for a time sufficient to replace boron with silicon, and recovering the siliceous zeolite having reduced boron content but substantially preserved initial aluminum content.

2. The process of claim 1 wherein said catalyst composition comprises said siliceous zeolite and a matrix.

3. The process of claim 2 wherein said matrix is alumina-containing material.

4. The process of claim 2 wherein said catalyst composition is in the form of an extrudate.

5. The process of claim 2 wherein said catalyst composition is in the form of beads.

6. The process of claim 1 wherein said conversion conditions include a temperature of from about 230° C.

to about 80° C., a pressure of from about 10 kPa to about 3,550 kPa, a liquid hourly space velocity of from about 0.6 hr$^{-1}$ to about 10 hr$^{-1}$ and a hydrogen/feedstock hydrocarbon compound mole ratio of from 0 to about 100.

7. A process for calaytically dewaxing a hydrocarbon oil feed to provide a catalytically dewaxed oil with reduced pour point, which process comprises contacting said feed at a temperature of from about 230° C. to about 500° C., a pressure of from about 10 kPa to about 20,300 kPa and a liquid hourly space velocity of from about 0.5 hr$^{-1}$ to about 100 hr$^{-1}$ with a catalyst composition comprising a siliceous zeolite prepared by the method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

8. The process of claim 7 wherein said catalyst composition comprises said siliceous zeolite and a matrix.

9. The process of claim 8 wherein said matrix is alumina-containing material.

10. The process of claim 8 wherein said catalyst composition is in the form of an extrudate.

11. The process of claim 8 where said catalyst composition is in the form of beads.

12. A process for catalytically dewaxing a lubricating oil base stock to provide a lubricating oil with reduced pour point, which process comprises contacting said base stock at a temperature of from about 230° C. to about 500° C., a pressure of from about 10 kPa to about 20,300 kPa and a liquid hourly space velocity of from about 0.5 hr$^{-1}$ to about 100 hr$^{-1}$ and a hydrogen/oil mole ratio of 0 to about 100 with a catalyst position comprising a siliceous zeolite prepared by the method comprising providing a boron-containing zeolite Beta with initial boron and aluminum contents each greater than the numeral 0, treating the zeolite with silicon tetrachloride at a temperature and for a time sufficient to replace boron with silicon, and recovering the siliceous zeolite having reduced boron content but substantially preserved initial aluminum content.

13. The process of claim 12 wherein said catalyst composition comprises said siliceous zeolite and a matrix.

14. The process of claim 13 wherein said matrix is alumina-containing material.

15. The process of claim 13 wherein said catalyst composition is in the form of an extrudate.

16. The process of claim 13 wherein said catalyst composition is in the form of beads.

* * * * *

UNITED STATES PATENT AND TRADEMARK OFFICE
CERTIFICATE OF CORRECTION

PATENT NO. : 4,784,749

DATED : November 15, 1988

INVENTOR(S) : Clarence D. Chang, David S. Shihabi and Paul B. Weisz

It is certified that error appears in the above-identified patent and that said Letters Patent is hereby corrected as shown below:

Col. 4, line 47, delete "an" and insert --and--.

Col. 4, line 56, delete "mde" and insert --made--.

Col. 4, line 58, delete "knownt ot hose" and insert --known to those--.

Col. 5, line 4, delete "readlly" and insert --really--.

Col. 5, line 8, delete "particulArly" and insert --particularly--.

Col. 5, line 38, delete "shalloysite" and insert --halloysite--.

Col. 5, line 50, after "zirconia.", delete "the" and insert --The--.

Col. 5, line 66, delete "sits" and insert --sites--.

Col. 6, line 25, delete "compred" and insert --compared--.

Col. 6, line 52, claim 1, delete "zeolie" and insert --zeolite--.

UNITED STATES PATENT AND TRADEMARK OFFICE
CERTIFICATE OF CORRECTION

PATENT NO. : 4,784,749

DATED : November 15, 1988

INVENTOR(S) : Clarence D. Chang, David S. Shihabi and Paul B. Weisz

It is certified that error appears in the above-identified patent and that said Letters Patent is hereby corrected as shown below:

Col. 6, line 54, claim 1, delete "for" and insert --and--.

Col. 7, line 1, claim 6, delete "80°C" and insert --800°C--.

Signed and Sealed this

Second Day of May, 1989

Attest:

DONALD J. QUIGG

Attesting Officer

Commissioner of Patents and Trademarks